United States Patent [19]

Sowman

[11] 4,349,456
[45] Sep. 14, 1982

[54] NON-VITREOUS CERAMIC METAL OXIDE MICROCAPSULES AND PROCESS FOR MAKING SAME

[75] Inventor: Harold G. Sowman, Maplewood, Minn.

[73] Assignee: Minnesota Mining and Manufacturing Company, St. Paul, Minn.

[21] Appl. No.: 69,794

[22] Filed: Aug. 27, 1979

Related U.S. Application Data

[63] Continuation of Ser. No. 679,366, Apr. 22, 1976, abandoned.

[51] Int. Cl.$^3$ ............... B01J 13/02; C09K 3/00; C01G 49/06; B32B 5/18
[52] U.S. Cl. ............... 252/317; 106/300; 206/0.6; 252/62.56; 252/316; 252/477 R; 423/633; 264/4; 264/15
[58] Field of Search ............... 252/301.1 S, 316, 62.56, 252/634, 635, 317; 423/633

[56] References Cited

U.S. PATENT DOCUMENTS

| | | | |
|---|---|---|---|
| 2,449,253 | 9/1948 | Sargent | 252/317 |
| 2,978,339 | 4/1961 | Veatch et al. | 106/40 V |
| 2,978,340 | 4/1961 | Veatch et al. | 106/40 V |
| 3,273,962 | 9/1966 | Walsh | 423/627 X |
| 3,312,632 | 4/1967 | Smith | 252/301.1 S |
| 3,313,602 | 4/1967 | Smith et al. | 252/301.1 S X |
| 3,493,514 | 2/1970 | Ashby et al. | 252/301.1 S |
| 3,708,432 | 1/1973 | Triggiani et al. | 252/301.1 S |
| 3,788,955 | 1/1974 | Crites et al. | 204/25 |

FOREIGN PATENT DOCUMENTS

| | | | |
|---|---|---|---|
| 1169615 | 11/1969 | United Kingdom | 252/301.1 S |
| 1192096 | 5/1970 | United Kingdom | 252/301.1 S |
| 1322814 | 7/1973 | United Kingdom | 252/301.1 S |

*Primary Examiner*—Richard D. Lovering
*Attorney, Agent, or Firm*—Cruzan Alexander; Donald M. Sell; William G. Ewert

[57] ABSTRACT

Shaped and fired, porous or impermeable nonvitreous ceramic microcapsules of metal oxide, preferably transparent and polycrystalline, are made by a non-melt process comprising the liquid-liquid extraction of aqueous metal oxide precursor with a dehydrating liquid having a limited water solubility, and drying and firing the resulting gelled microcapsules. For example, an aqueous titania sol is added to an agitated body of n-butanol to form a dispersion of droplets of said sol and water is rapidly extracted from the droplets to form gelled microcapsules; the latter are recovered by filtration, dried, and fired to convert them into transparent, sealed or heat-sealable, non-vitreous ceramic, spherical microcapsules of polycrystalline titania. The microcapsules can be used as fillers for plastic and other composites or filled with a selected solid, liquid or gas for purpose of storing, transporting, or facilitating the use of the same.

29 Claims, 2 Drawing Figures

NON-VITREOUS CERAMIC METAL OXIDE MICROCAPSULES AND PROCESS FOR MAKING SAME

This is a continuation, application Ser. No. 679,366 filed Apr. 22, 1976 and now abandoned.

This invention relates to non-vitreous ceramic microcapsules and a non-melt process for their preparation. In another aspect, it relates to shaped and fired, spherical, non-vitreous ceramic microcapsules of metal oxide, such as titania, preferably transparent microcapsules of polycrystalline ceramic metal oxide, which microcapsules can be porous or impermeable, filled or evacuated. In another aspect, it relates to a process for making said microcapsules by sol-gel techniques involving steps of liquid-liquid extraction, drying and firing. In a further aspect, it relates to composites containing said microcapsules.

Various hollow, blown, expanded, or solid spherical particles, or microspheres, of various refractory materials useful, for example, as fillers for plastic composites or the like, have been disclosed, patented or used in the past, e.g. see U.S. Pat. Nos. 2,340,194, 3,264,073, 3,273,962, 3,298,842, 3,365,315, 3,380,894, 3,528,809 and 3,748,274, British Pat. Nos. 1,122,412 and 1,125,178, French Pat. No. 2,047,751, and Belgium Pat. No. 779,967. The particles or microspheres and/or their methods of preparation disclosed in these references have one or more disadvantages or limitations which have handicapped their commercialization or restricted their field of application.

Briefly, in one aspect, the present invention provides shaped and fired, non-blown or non-expanded, spherical, smooth-surfaced, free-flowing, discrete, rigid, crushable microcapsules, the wall or shell of each being of uniform thickness, porous, and preferably heat-sealable, or impermeable, preferably transparent and clear, and made of homogeneous, non-vitreous ceramic polycrystalline metal oxide or amorphous metal oxide convertible to polycrystalline metal oxide upon direct firing at elevated temperature. The hollow, central void or interior within these microcapsules (thus accounting for their relative light weight or low density) can be filled with selected solid, liquid, air or other gas, or can be evacuated. These microcapsules are made by a non-melt process comprising steps of liquid-liquid extraction, drying, and firing, without requiring coating, leaching, or a gas-blowing or expanding means to form the void therein.

As used in this application, the term "microcapsule" means a unicellular, hollow particle, that is, a particle having a peripheral wall or shell enclosing or surrounding a single hollow, cavity, space or void within the interior of the particle which, unless otherwise noted, may be evacuated or filled with a gas, liquid or solid, such particle being so small as to require means such as an optical microscope for purposes of measuring the dimensions thereof. A microcapsule characterized herein as "spherical" is one which has the shape of a true sphere or spheroid, that is, like a sphere, e.g., oblate or prolate. A microcapsule characterized herein as "porous" is one whose wall has interconnected submicroscopic pores or passages and is permeable to liquid and/or gas, whereas an "impermeable" microcapsule is one whose wall is sealed, non-porous or closed such as to maintain the contents within the interior void of the microcapsule. A microcapsule whose wall is "homogeneous" is one whose wall under optical microscopic examination (e.g. at 104X) is completely or essentially free of extraneous inhomogenities, such as pores, voids, occlusions, inclusions, or dispersions. A "transparent" microcapsule is one whose wall will transmit visible light such that the outline, periphery or edges of bodies beneath and in contact with fragments of the microcapsules will be sharply discernible under an optical microscope (e.g. at 140X). A "polycrystalline" metal oxide is one with a sufficient degree of crystallinity or microcrystallinity such that the crystalline species thereof can be readily discernible or identified by conventional X-ray or electron diffraction, whereas an "amorphous" metal oxide or phase is one whose X-ray diffraction pattern is free of distinguishable lines and thus can be considered as noncrystalline. A "vitreous" material (in addition to being like an amorphous material) is one which is derived from a melt, while a "non-vitreous" material is not.

The liquid-liquid extraction step of the process of this invention can be and preferably is carried out at ambient temperatures (i.e., without heating) and with agitation. In this extraction step, aqueous precursor material comprising a solution, dispersion or sol of one or more metal oxides, or one or more metal compounds calcinable to metal oxides, is mixed with a dehydrating agent comprising an organic dehydrating liquid capable of rapidly extracting at ambient room temperature (23° C.) a sufficient, major amount of the water (e.g. at least 75% or even as high as 85–95% or higher) from the resulting droplets of said precursor material in less than 30 seconds, preferably in less than 15 seconds, to dehydratively gel substantially all of the said droplets and form gelled microparticles. The bulk of these or predominant amount of these gelled microparticles are liquid-filled, porous, spherical, preferably transparent, microcapsules. The wall of these microcapsules comprises said gelled precursor material and the liquid contained within the microcapsules comprises water and said dehydrating liquid. The gelled, liquid-filled microcapsules are recovered and dried in a suitable atmosphere, e.g. air, and then fired, for example in air at 300°–500° C., to remove fugitive material, e.g. organic material and water, and form porous, non-vitreous ceramic metal oxide microcapsules, the liquid formerly within the gelled microcapsules being replaced with the atmosphere used in said drying operation. Upon firing the microcapsules at higher temperature, e.g. at 500°–1000° C. or higher, in a suitable atmosphere, e.g. air or nitrogen, or vacuum, the ceramic walls of the microcapsules may be impermeable with the atmosphere or vacuum used in this firing step being sealed or entrapped within the microcapsules. Said firing of the microcapsules at a temperature in the range 500°–1000° C. or higher promotes densification and crystallite growth to the extent that polycrystalline metal oxide is discernible or identifiable by X-ray or electron diffraction techniques.

In the accompanying drawing, the various figures are pen-and-ink sketches of photomicrographs taken with a light microscope at 150X using transmitted light, the sketches being drawn to the same scale as the photomicrographs.

Figure 1:
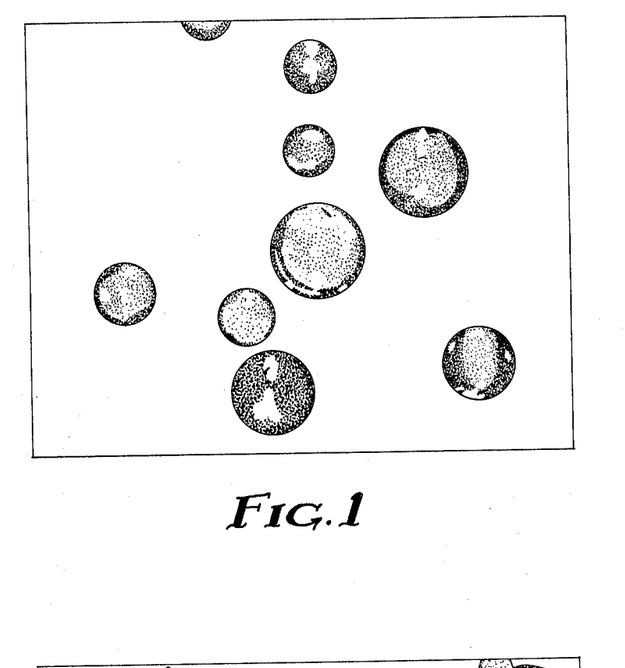
FIG. 1 represents shaded sketches of ceramic, porous, transparent, spherical microcapsules of this invention obtained as described hereinafter in Example 8 by firing in air dried, gelled, porous, spherical microcapsules to 460° C., the walls of the fired microcapsules consisting of polycrystalline anatase titania, $TiO_2$.
Figure 2:
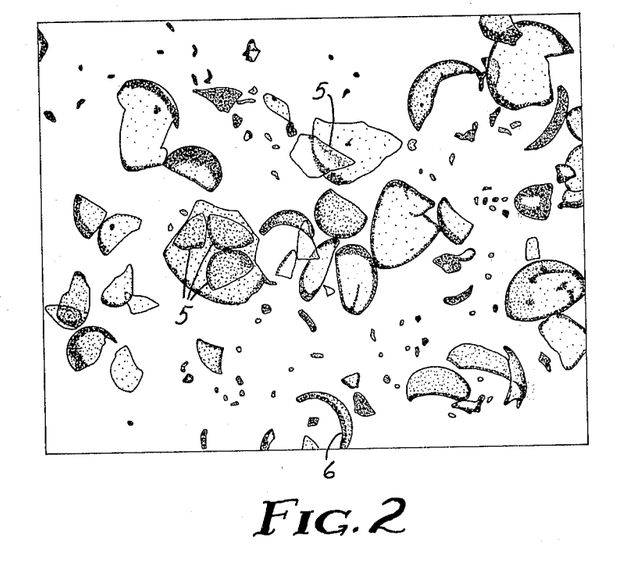
FIG. 2 represents fragments of the same batch of fired microcapsules represented in FIG. 1 which have been broken by crushing between glass microscope slides to show the transparency and thickness of the walls of the microcapsules. The transparency (as in glass microbubbles) is clearly manifested by the discernibility of the undistorted, sharp edges, some of which are denoted by reference number 5, of fragments when observed through overlying fragments contiguous therewith. The relatively uniform thin wall (about 7-10 microns in thickness in this instance) of each microcapsule is clearly shown by reference number 6.

The aqueous precursor material used to form the microcapsules of this invention comprises an aqueous solution, dispersion or sol of one or more metal oxides or metal compounds calcinable to metal oxides, or mixtures of said forms of precursor materials. The precursor material should be pourable and stable, that is, non-gelled, non-flocculated or non-precipitated. The equivalent concentration of the metal oxide in the precursor material can vary widely, e.g. a few tenths of one weight % to 40 or 50 weight %, and the particular concentration chosen will be dependent on the particular form of the precursor metal oxide and dehydrating liquid used and the desired dimensions and proposed utility of the microcapsules. Generally, this concentration will be that sufficient to promote rapid formation of droplets in the dehydrating liquid and, generally, the lower the equivalent concentration of metal oxide in the precursor materials, the thinner the walls and the smaller the diameters of the microcapsules.

The aqueous precursor can be a dispersion or sol of one or more (e.g. 1 to 5, or more) ceramic metal oxides, i.e. metal oxides which can be fired into a rigid or self-supporting polycrystalline form and are stable in a normal air environment, e.g., 23° C. and 50% relative humidity. Useful representative ceramic metal oxides include $TiO_2$, $Cr_2O_3$, $WO_3$, $ThO_2$, $Fe_2O_3$, $MgO$, $Y_2O_3$, $ZrO_2$, $HfO_2$, $V_2O_5$, $Nb_2O_5$, $UO_2$, $BeO$, $CoO$, $NiO$, $CuO$, $ZnO$, $In_2O_3$, $Sb_2O_3$, $Al_2O_3$, $SnO_2$, and mixtures thereof such as $ZnO$—$TiO_2$, $TiO_2$—$Fe_2O_3$, $SnO_2$—$TiO_2$, $Nd_2O_3$—$TiO_2$, $Al_2O_3$—$Cr_2O_3$, $MgO$—$Al_2O_3$, $MgO$—$TiO_2$, $MgO$—$ZrO_2$, $ThO_2$—$UO_2$, $ThO_2$—$CeO_2$, $Bi_2O_3$—$TiO_2$, $BeO$—$Al_2O_3$, $TiO_2$—$Fe_2O_3$—$Al_2O_3$, $Al_2O_3$—$Cr_2O_3$—$Fe_2O_3$, $PbO$—$ZrO_2$—$TiO_2$, $ZnO$—$Al_2O_3$—$Cr_2O_3$, $Al_2O_3$—$Cr_2O_3$—$Fe_2O_3$—$TiO_2$, and $ThO_2$—$Al_2O_3$—$Cr_2O_3$—$Fe_2O_3$—$TiO_2$. It is also within the scope of this invention to use dispersion or sols of said ceramic metal oxides in combination or admixture with dispersions or sols of one or more metal oxides which are unstable in normal air environment (such as $Li_2O$, $Na_2O$, $K_2O$, $CaO$, $SrO$, and $BaO$) and/or ceramic nonmetal oxides having an atomic number of 14 or greater (such as $SiO_2$, $As_2O_3$, and $P_2O_5$), representative combinations including $Al_2O_3$—$Li_2O$, $TiO_2$—$K_2O$, $ZrO_2$—$CaO$, $ZrO_2$—$Al_2O_3$—$CaO$, $ZrO_2$—$SrO$, $TiO_2$—$BaO$, $TiO_2$—$ZrO_2$—$BaO$, $Al_2O_3$—$Na_2O$, $MgO$—$SiO_2$, $Fe_2O_3$—$BaO$, $ZrO_2$—$SiO_2$, $Al_2O_3$—$As_2O_3$, $ZrO_2$—$P_2O_5$, $Al_2O_3$—$SiO_2$, $Al_2O_3$—$B_2O_3$—$SiO_2$, $Al_2O_3$—$Cr_2O_3$—$SiO_2$. Thus, the ceramic microcapsules of this invention consist, consist essentially of, or comprise polycrystalline ceramic metal oxide (or amorphous ceramic metal oxide convertible thereto by firing), the "ceramic metal oxide" including systems of said oxides in free or combined forms.

A number of the above-described oxides useful in this invention are commercially available in the form of aqueous sols or dry powders which can be readily dispersed in water to form sols, such as $Al_2O_3$, $Cr_2O_3$ and $Fe_2O_3$ sols sold under the trademark "Nalco", silica sols sold under the trademarks "Nalco," "Ludox," "Syton" and "Nyacol," and $Al_2O_3$ colloidal powder sold under the trademark "Dispal."

Instead of using the precursor material in the form of dispersion or sols of said oxides, it is within the scope of this invention to use the precursor material in the form of water soluble or dispersible inorganic or organic compounds which are calcinable to the corresponding oxide. These compounds representatively include many carboxylates and alcoholates, e.g. acetates, formates, oxalates, lactates, propylates, citrates, and acetylacetonates, and salts of mineral acids, e.g., bromides, chlorides, chlorates, nitrates, sulfates, and phosphates, selection of the particular precursor compound being dictated by availability and ease of handling. Representative precursor compounds useful in this invention include ferric chloride or nitrate, chromium chloride, cobalt nitrate, nickel chloride, copper nitrate, zinc chloride or carbonate, lithium propylate, sodium carbonate or oxalate, potassium chloride, beryllium chloride, magnesium acetate, calcium lactate, strontium nitrate, barium acetate, yttrium bromide, zirconium acetate, hafnium oxychloride, vanadium chloride, ammonium tungstate, aluminum chloride, indium iodide, titanium acetylacetonate, stannic sulfate, lead formate, antimony chloride, bismuth nitrate, neodymium chloride, phosphoric acid, cerium nitrate, uranium nitrate, and thorium nitrate.

The preferred form of the precursor materials used in making microcapsules composed of a single metal oxide composition is an aqueous sol of the metal oxide. Where the microcapsules are composed of two oxides, the precursor material can be a mixture of an aqueous sol of each oxide or an aqueous solution of one oxide or its precursor with an aqueous sol of the other oxide precursor. Where microcapsules composed of a major amount of one oxide and a minor amount of another oxide are desired, the precursor of the major oxide is generally preferably in the form of an aqueous sol. In general, the form of the particular precursor to be used will be dictated by its availability and ease of handling. For example, the precursors of alumina, titania, chromia, silica are preferably in the form of aqueous oxide sols, and the precursors of lithia, calcia, magnesia and baria are preferably aqueous solutions of their soluble salts.

The preparation of dispersions, sols and solutions useful in the practice of this invention will be omitted in the interest of brevity since it will be within the skill of the art to prepare such materials, representative teaching in the art for this purpose being U.S. Pat. No. 3,709,706 and pending application Ser. No. 119,726, now U.S. Pat. No. 3,796,524. It may be desirable to filter the aqueous precursor material before use in order to remove artifact, large colloids, or extraneous matter.

Where microcapsules composed of two or more oxides are to be made, e.g., binary, ternary, and quaternary oxide compositions, the overall precursor material will contain sufficient amounts of the individual precursors to impart desired properties to the microcapsules. For example, where microcapsules are desired having a certain degree of magnetism lower than that obtained from microcapsules composed only of iron oxide, the precursor material will comprise aqueous ferric nitrate admixed with a sufficient amount of titania, alumina or silica aqueous sol to obtain the desired lower degree of magnetism. As another example, where colored titania microcapsules are desired, e.g., as fillers for polyester coating resins, the precursor material can be an aqueous titania sol admixed with a sufficient amount of aqueous ferric nitrate, 500° C.-fired microcapsules of 95 weight % $TiO_2$ and 5 weight % $Fe_2O_3$ having a gold color and 500° C.-fired microcapsules of 90 weight % $TiO_2$ and 10 weight % $Fe_2O_3$ having a bronze color.

The dehydrating liquid used to dehydratively gel the precursor material is preferably a liquid in which water has a limited solubility and in which water is miscible to a limited extent. Such a dehydrating liquid will practically instaneously cause formation of liquid droplets of the precursor material and rapidly extract the major amount of the water from the droplets to form discrete, dispersed, liquid-filled microcapsules having a porous gelled wall or shell, the physical integrity of which is maintained in the body of dehydrating liquid. The formation of a substantially quantitative yield of gelled microcapsules is complete within 30 seconds. Further, this formation does not require heating (i.e., it can be accomplished at ambient room temperature, e.g., 23° C.) nor does it require use of a barrier liquid. Though a small amount of solid beads may also be formed, the predominant amount, i.e., at least 85-95% or higher, of the microparticles formed will be in the form of microcapsules. If the liquid-liquid extraction is carried out in a batch operation, there may be a tendency to form said small amount of solid beads (or relatively thicker-walled microcapsules) toward the end of the extraction due to the progressively decreasing dehydrating ability of the dehydrating liquid as it extracts the water from the precursor material.

Generally, dehydrating liquids useful in the practice of this invention preferably will have a limited solubility of about 3 to 50 weight %, preferably 15 to 40 weight % for water (based on the weight of the dehydrating liquid) at 23° C. Representative organic dehydrating liquids useful in this invention are alcohols, such as alkanols with 3-6 carbon atoms, e.g. n-butanol, sec-butanol, 1-pentanol, 2-pentanol, 3-methyl-2-butanol, 2-methyl-2-butanol, 3-methyl-3-pentanol, 2-methyl-1-propanol, 2,3-dimethyl-2-butanol and 2-methyl-2-pentanol, cyclohexanol, ketones such as methyl ethyl ketone, amines such as dipropylamine, and esters such as methylacetate, and mixtures thereof. Some of these dehydrating liquids, e.g. n-butanol, when used to form microcapsules with relatively large diameters, e.g. 100-500 microns or larger, may have a tendency to cause micro-cracks in the walls of the microcapsules. Such micro-cracks can be prevented or minimized when such dehydrating liquids are used to form large microcapsules by adding a small amount of water to such dehydrating liquids, e.g. 5 to 10% by weight of the dehydrating liquid. However, the resulting water-dehydrating liquid mixture still has said limited solubility for water, preferably at least 15 weight %.

If a dehydrating liquid with a water solubility of less than about 3 weight % is used, such as 2-ethyl-1-hexanol per se, the rate of extraction from the droplets of precursor material will be relatively slow, e.g. complete extraction will be longer than one minute, and even as long as 10 minutes or more, and the gelled precursor will be in the form of solid microspheres (or beads). However, dehydrating liquids with said low water solubility, e.g. 2-ethyl-1-hexanol, can be used in combination with those aforementioned dehydrating liquids having greater water solubility, e.g. 15 to 50 weight %, to form the microcapsules of this invention. For example, 2-ethyl-1-hexanol has a relatively higher boiling point than n-butanol and when a mixture of 5-20 weight % of the former and 80-95 weight % of the latter is used, the economics of the extraction operation are improved in that losses of the alcohols due to volatilization are decreased. Although the precursor material can be first injected into 2-ethyl-1-hexanol to form droplets and then a small amount of a completely water miscible solvent such as methanol added, the bulk of the gelled microparticles formed will be solid beads with a low yield of porous, liquid-filled microcapsules. A good yield of porous, liquid-filled microcapsules can be formed by mixing the precursor material with a small amount of a completely water miscible liquid, such as methanol, and then injecting the mixture into a liquid with low water solubility, such as 2-ethyl-1-hexanol.

If a dehydrating liquid is used which has unlimited solubility in water and is completely miscible therewith, as in the case of methanol or ethanol, neither microcapsules nor solid beads are formed and in most cases the precursor material in effect is merely diluted or further dispersed by such dehydrating liquid.

The liquid-liquid extraction step of this invention can be carried out at ambient temperatures, e.g. 20° to 40° C.; higher temperatures, e.g. 60° C. and higher, cause fragmentation of the gelled microcapsules. Excellent, substantial, quantitative yields, e.g. 95% and higher, of gelled microcapsules, based on the equivalent oxide solids content of the precursor material, can be conveniently achieved at room temperature (23° C.). In order to quickly and efficiently dehydratively gel the droplets of the precursor material in a batch operation, the body of dehydrating liquid is preferably subjected to externally applied agitation (e.g. by swirling the body of dehydrating liquid or by inserting a stirrer therein) when the precursor material is added thereto, and said agitation is continued during the course of dehydration of the resultant droplets of precursor material. This agitation maintains the droplets in suspension (and thereby prevents agglomeration and settling of the droplets) and ensures maintenance of relatively anhydrous dehydrating liquid in contact with the surface of the droplets as they are dehydrated. In a continuous liquid-liquid extraction operation, equivalent agitation can be accomplished by adding the precursor material at a point to a stream of the dehydrating liquid flowing at a sufficient rate to maintain the droplets in suspension in the course of their dehydration.

The dehydration of the droplets to form the gelled microcapsules will be sufficiently complete within 30 seconds, and usually in less than 15 seconds, from the time of addition of the precursor material, that addition being in the form of drops, flowing stream, or by bulk.

The size of the droplets, and consequently the size of the resultant gelled and fired microcapsules, will be affected by the degree or type of agitation of the dehydrating liquid as the precursor material is added thereto. For example, with high shear agitation, e.g. that obtained with a Waring Blendor, relatively tiny droplets (and gelled microcapsules) can be formed, e.g. with diameters less than 20 microns. In general, gelled microcapsules with diameters in the range of about 1 to 1000 microns can be produced in accordance with this invention.

The gelled, porous, transparent, liquid-filled microcapsules can be separated and recovered from the dehydrating liquid in any suitable manner, e.g. by filtration, screening, decanting, and centrifuging, such separation being preferably performed soon after completion of the extraction step. Where the gelled microcapsules are recovered by filtration, filter cake comprising said microcapsules and residual dehydrating liquid is obtained. In any event, the recovered mass of gelled microcapsules are then sufficiently dried to remove the residual dehydrating liquid and the liquid within the microcapsules, the resultant dried, gelled microcapsules being conveniently referred to herein as green microcapsules, i.e. dried and unfired. Said drying can be accomplished in any suitable manner, care being exercised to prevent too rapid an evaporation in order to minimize fracturing or bursting of the microcapsules. This drying can be carried out in ambient air and pressure in a partially enclosed vessel at temperatures, for example, of 20°–25° C. Higher or lower drying temperatures can be used with commensurate adjustment of pressure if necessary to prevent fracture of the wall of the microcapsules. During the course of drying, the liquid within the microcapsules diffuses through the shell or wall of the microcapsules, as evidenced by microscopic observation of the retreating upper surface or meniscus of the liquid within the transparent microcapsules, thus attesting to the porous nature of the gelled microcapsules. The larger the dried microcapsules are, the more free-flowing they are. The dried microcapsules have sufficient strength to permit subsequent handling. It may be desired to screen classify them to obtain desired size fractions.

The dried microcapsules are then fired to convert them to spherical, smooth-surfaced, light weight or low density, rigid, crushable microcapsules, the shell or wall of which is non-vitreous, synthetic, ceramic, homogeneous, preferably transparent and clear, and comprises metal oxide which is polycrystalline or is amorphous metal oxide convertible to polycrystalline metal oxide upon firing at higher temperature. Depending on the particular oxide precursor material and firing temperature used, the walls of the fired microcapsules will be porous and heat-sealable or impermeable, the metal oxide in the walls being present in whole or in part in the polycrystalline state or in an amorphous state capable of conversion upon further firing to the polycrystalline state. For example, dried, gelled microcapsules made from $Al_2O_3$—$B_2O_3$—$SiO_2$ precursor material can be prefired at 500° C. to produce porous, transparent, ceramic microcapsules comprising amorphous $Al_2O_3$—$B_2O_3$—$SiO_2$, which can be further fired at 1000° C. to form impermeable, transparent, ceramic microcapsules comprising polycrystalline aluminum borosilicate and an amorphous phase. As another example, dried, gelled microcapsules made from $TiO_2$ precursor material can be prefired at 250°–450° C. to produce porous, transparent, ceramic microcapsules consisting of polycrystalline anatase $TiO_2$, and these microcapsules can be further fired to or at 650° C. to form impermeable, transparent, ceramic microcapsules consisting of anatase titania, $TiO_2$, and even further fired at 800° C. to form impermeable, ceramic microcapsules consisting of polycrystalline rutile $TiO_2$. The dried, gelled microcapsules can be fired in one step directly to impermeable microcapsules.

In most instances, the crystallites in the polycrystalline metal oxide are less than 2000 Angstroms and usually (and preferably for purposes of transparency) less than 1000 Angstroms. However, crystallites up to 20,000 Angstroms or higher, for example, can be obtained in the same precursor materials, e.g. $Fe_2O_3$, microcapsules with such large crystallites appearing grainy under a microscope (e.g. 140X).

In general, the particular firing temperature used to convert dried and gelled (or "green") microcapsules into ceramic microcapsules will be dependent on the particular precursor material used and the particular physical and compositional properties desired in the ceramic microcapsules and the intended utility thereof. Generally, the firing temperature selected for these purposes will be 250° to 1300° C.

Although firing of the microcapsules to the impermeable state results in some densification of the walls, accompanied by some shrinkage and a slight decrease in diameter, the size or size distribution of the fired microcapsules is controlled as a practical manner in the extraction operation as discussed above and, thus, the diameters of the fired microcapsules will be in the range of about 1 to 1000 microns. The wall of the fired microcapsule will be uniformly thick and in the range generally of 0.1 to 100 microns. The fired microcapsules can also be separated into desired size fractions by screen or air classification, elutriation, etc., and any solid microparticles, beads and fragments of broken microcapsules can be separated by flotation or winnowing techniques.

The firing step can be carried out in an atmosphere that will not be detrimental to the conversion of the gelled microcapsules to the desired ceramic microcapsules. An air atmosphere will generally be useful. A hydrogen or other reducing atmosphere can be used where desired to form ceramic microcapsules comprising reduced metal oxides, e.g. FeO, or metals, e.g. Fe. Inert atmospheres, e.g. argon, nitrogen, xenon, neon, or helium, can be used, particularly where it is desired to form ceramic microcapsules with such inert atmospheres filled and heat-sealed therewith. Generally, where it is desired to form sealed ceramic microcapsules with a vacuum or select gas (other than air) encapsulated therein, it will be convenient to use an air atmosphere to convert the dried, gelled microcapsules to porous ceramic microcapsules and then heat-seal the latter in a vacuum or an atmosphere of the select gas.

The pressure within the sealed microcapsules will be dependent upon the temperature at which sealing is accomplished and the pressure of the select gas at that temperature. Thus, the pressure within the sealed microcapsules can be varied over a wide range, from sub-atmospheric to super-atmospheric and predetermined and calculated according to the gas laws. This process allows the encapsulation of very pure gases and preselected mixtures of gases.

In firing the dried, gelled microcapsules, care should be exercised to avoid ignition of combustible material in or evolved from the green microcapsules. Said ignition may cause localized or general overheating which may cause rupture of the microcapsules or undesirable changes in the properties of the microcapsules such as loss of transparency and strength. For example, ignition can be avoided by starting the firing at a low temperature and then elevating the temperature at a slow rate. It may be necessary to facilitate removal of combustible material by limiting the depth of the bed of microcapsules and/or by maintaining a gentle air flow over or through the bed.

Because of their high temperature stability or refractoriness, the ceramic microcapsules of this invention are useful in applications where high temperatures are encountered, for example, up to 1000° C. or even 2000° C.

or higher. And they are useful in low or moderate temperature applications where their chemical stability or inertness and physical properties such as strength, imperviousness, and microscopic dimensions and shape lend themselves to advantage. For example, a mass or layer of the microcapsules sealed with air or other gas can be used as insulation for kilns or cryogenic fuel tanks. Other uses for the microcapsules are as catalyst support or as the catalyst per se in petrochemical operations such as crackings, oxidization, hydrogenation, etc. The particular application or utility of the ceramic microcapsules will be dependent upon their composition and form, e.g., empty (i.e. evacuated), filled, porous or sealed. The microcapsules can be employed alone or per se in various applications in the form in which they are obtained as fired, or their physical form can be modified after firing and they can be used in combination with other materials.

One area of utility for the porous or sealed evacuated or gas-filled microcapsules of this invention is that of fillers or reinforcement for structural plastic, elastomeric, metallic, or ceramic composites, especially those composites used in high temperature environments or even hyperthermal environments found in the aerospace industry and in ablative environments or because of their light weight or buoyancy those composites used in marine environments. Techniques used in forming composites where the microcapsules of this invention find utility are disclosed, for example, in "Modern Composite Materials," edited by Brantman and Krock, Addison-Wesley Pub. Co., Teading, Mass. (1967) and "Handbook of Reinforced Plastics," by Oleesky and Mohr, Reinhold Pub. Corp., N.Y. (1964). In general, the microcapsules of this invention will find the same utility as fillers as that known for glass microbubbles or microballons (e.g. see U.S. Patent 3,585,157 and 3,365,315, Bulletins GBIF-1(82.1)R, June 12, 1972 and L-GBPBC-2(110.2)R, Dec. 1, 1970 of the 3M Company, and SPE Journal, Vol. 25, No. 4, p. 83–87, April, 1969). Suitable representative plastic metal, elastomeric and ceramic materials which can be used as the matrices for such composites are described in U.S. Pat. No. 3,709,706, issued Jan. 9, 1973 to H. G. Sowman.

The capability of the microcapsules to be sealed lends itself to diverse applications of the microcapsules in their evacuated or filled form. The evacuated microcapsules can be used per se or in composites in thermal insulation applications. The filled microcapsules can be used to store and transport the fill material, the release of which can be accomplished if and when desired by mechanical fracture of the filled microcapsules. For example, microcapsules can be filled and sealed with inert gases, such as nitrogen, argon, neon, xenon, helium and krypton, radioactive gases such as krypton 85, reactive gases such as oxygen, hydrogen, carbon dioxide, nitrogen oxide, sulfur dioxide, bromine, iodine, chlorine and other gases. Batches of microcapsules filled with different gases can be mixed together in desired ratios and the mixture crushed or fractured when desired to release the gases, for example, to permit the reaction thereof. And, for example, the microcapsules can be filled with liquids, such as acetic acid, and sealed, the release of which can be used in a system to control its pH.

Where it is desired to fill the microcapsules with a liquid, e.g. for purposes of storing said liquid and releasing the same if and when desired, the fired, porous microcapsules can be first evacuated in a suitable evacuation chamber to which then the liquid is introduced to fill the microcapsules, pressurization being used if necessary. The liquid-filled microcapsules can be separated from any excess of the liquid, e.g. by filtration, and the filled microcapsules then sealed. One technique which can be used to seal the liquid-filled microcapsules is by coating them with a suitable coating material, such as a polymeric coating dissolved in a solvent which is thereafter evaporated, leaving a thin, impervious, sealing film of the polymeric material on the exterior of the filled microcapsules, e.g. as disclosed in U.S. Pat. No. 3,117,027, issued Jan. 7, 1964 to J. A. Lindlof and D. E. Wurster or U.S. Patent 3,196,827, issued July 27, 1965 to D. E. Wurster et al.

The porous fired microcapsules (depending on the size of the pores) can be partially or substantially filled with various select solids. For example, a low melting solid can be heated to its melting point (e.g. acetamide) and the resulting liquid pressurized into evacuated porous fired microcapsules. After cooling, the excess solid can be removed from the exterior of the microcapsules by washing with a solvent. Subsequently, the filled microcapsules can be sealed if desired by the coating technique described above.

Alternatively, the porous fired microcapsules can be evacuated and gaseous sublimation product (e.g. of camphor) can be equilibrated in the evacuation chamber. Upon cooling, the sublimation product can condense on the interior walls to form a partially filled microcapsule. The product on the exterior walls can be removed with solvent. Additionally, the filled microcapsule can be subsequently sealed if desired by coating.

Another alternative would utilize a solution of a salt or compound (e.g. $CoCl_2$-water solution) which deposits solid materials within the microcapsule upon evaporation of the solvent. Repeating this cycle adds additional quantities to the interior of the microcapsule. Again, the microcapsule can be sealed if desired.

An additional method of filling a porous fired microcapsule involves metathesis or precipitation reactions. Microcapsules can be partially filled with a solvent containing a salt (e.g. aqueous $Cd(NO_3)_2$), followed by further filling of the capsule with a gaseous reactant (e.g. $H_2S$) which contains ions required to precipitate the desired compound (e.g. CdS).

The transparent quality of ceramic microcapsules of this invention is indicative of their freedom from gross inhomogeneities and is a property coincident with other desirable properties, such as uniformity of composition and microstructure and heat sealability. This transparent property makes the ceramic microcapsules useful, for example, as pigments for coloring plastic composites.

The following examples illustrate the invention.

EXAMPLE 1

A fresh titanium dioxide sol was made by adding 5 parts tetraisopropyl titanate to 1 part concentrated hydrochloric acid (37%). The resulting sol was dried on standing in ambient air at room temperature, forming a gel which contained approximately 63% $TiO_2$. A portion of the dried gel was regenerated to an aqueous sol by dispersing with agitation 12.5 g. of the dry gel in 50 g. of water. The resulting regenerated sol was poured into 100 g. of swirling n-butyl alcohol, followed immediately by the addition of further n-butyl alcohol (300 g.) to the swirling mixture, and swirling of the resultant dispersion of microparticles continued for about 5 min.

The dispersion was filtered through No. 54 Whatman filter paper.

The recovered microparticles were found to be predominantly liquid-filled, transparent, spherical microcapsules. This microcapsule product was allowed to dry on standing in ambient air at room temperature for several hours to remove the liquid within the microcapsules and the resulting dried, porous, clear, transparent, spherical, green microcapsules were fired from room temperature to 550° C. in 1 hr. in an air atmosphere to form rigid, crushable, free-flowing, smooth-surfaced, homogeneous, clear, transparent, spherical, sealed, air-filled, ceramic microcapsules. X-ray diffraction analysis confirmed that the ceramic microcapsules were polycrystalline anatase $TiO_2$. The ceramic microcapsules had substantially uniform wall thicknesses, which were predominantly less than 10 microns, averaging about 7-8 microns, and had diameters which ranged from about 40 to 170 microns, the average diameter being approximately 100 microns.

EXAMPLE 2

A titania sol was made by dispersing with agitation 1.6 g. of another portion of the $TiO_2$ gel of Example 1 in 30 g. of water, followed by the addition of 0.6 g. of $Fe(NO_3)_3.9H_2O$. One-half of the resulting mixture was injected with a hypodermic syringe into an aqueous alcohol solution of 300 g. n-butyl alcohol and 30 g. water in a 1000 ml. round-bottom flask, the contents being swirled by hand, to form a dispersion of microparticles. The swirling action was continued for 1 min. to prevent particle settling and agglomeration.

The microparticles were recovered by filtering the dispersion through No. 54 Whatman filter paper and were found to be predominantly liquid-filled, transparent, spherical microcapsules. After drying the microcapsules in ambient air, the resulting dried, porous, clear, transparent, spherical, green microcapsules were fired in air to 500° C. in about 1 hr. The resulting ceramic microcapsules were rigid, crushable, free-flowing, smooth-surfaced, homogeneous, polycrystalline, clear, transparent, gold in color, spherical and had wall thicknesses of about 10 microns or less, the diameters in the range of 30 to 300 microns.

A portion of the ceramic microcapsules were then heated in a hydrogen atmosphere to 600° C. over several hours, allowed to cool to 250° C. in hydrogen, and then cooled to room temperature in a nitrogen atmosphere. The resultant microcapsules were shiny and black in appearance and were attracted to a permanent magnet, apparently due to the reduction of the $Fe_2O_3$ component.

EXAMPLE 3

A solution was made by dripping 504 g. titanium tetrachloride into 500 g. of agitated water maintained at approximately 20° C. Care was taken to prevent boiling and ejection of the acidic solution due to the ensuing exothermic reaction. A clear, yellow solution resulted. To 831 g. of this solution, 350 ml. of ammonium hydroxide (28%) were added with constant agitation, forming a thick white floc. The reaction mixture was filtered and washed thoroughly to remove excess $NH_4OH$, and 25 g. of the white floc were redispersed in 4.5 g. hydrochloric acid (37%), providing a sol with 8.6% $TiO_2$ (2.54 g. $TiO_2$). An additional 5 g. of water were added. One-half of the resulting sol was poured all at once into an agitated solution of 300 g. n-butyl alcohol and 15 g. water. Predominantly liquid-filled, transparent, spherical microcapsules were formed within 30 seconds.

The microcapsules were recovered by filtration through No. 54 Whatman filter paper and dried overnight at 95° C. The resultant dried, porous, clear, transparent, green microcapsules were fired from room temperature to 500° C. over about 1 hr., yielding rigid, crushable, freeflowing, smooth-surfaced, homogeneous, clear, transparent, polycrystalline anatase $TiO_2$ ceramic microcapsules

EXAMPLE 4

A sol was made by adding 2 g. of $SnCl_2.2H_2O$ to 11.5 g. water and then dispersing therein 1.15 g. $TiO_2$ gel (prepared as in Example 1 and assayed at 61.5% $TiO_2$). The resultant clear, yellow aquasol was filtered through No. 50 Whatman filter paper.

The filtered aquasol was added to a gently stirred aqueous alcohol solution containing 300 g. n-butyl alcohol and 22.5 g. water to form a dispersion of microparticles. The dispersion was filtered through a No. 54 Whatman filter paper. The recovered microparticles were predominantly liquid-filled, transparent, spherical microcapsules. They ranged in diameter from 20 to 250 microns, the average diameter being about 150 microns, and they had uniform wall thicknesses of about 10 microns. The microcapsules were allowed to dry in ambient air for several days, the dried microcapsules being porous, clear, transparent, and spherical.

The dried microcapsules were fired in air from room temperature to 500° C. in about 1 hr. and cooled to room temperature. The resulting ceramic microcapsules were rigid, crushable, free-flowing, smooth-surfaced, homogeneous and spherical and had diameters up to about 200 microns and uniform wall thicknesses of approximately 10 microns. Most of the ceramic microcapsules were transparent, with some of the microcapsules being slightly translucent. The transparent microcapsules were clear and colorless.

X-ray diffraction analysis of the ceramic microcapsules indicated the crystalline species to be similar to anatase titania; however, the lattice dimensions were larger than is common in anatase titania. The crystallite sizes estimated from line broadening of X-ray diffraction patterns of the microcapsules were less than 1000 Angstroms.

A portion of the ceramic microcapsules were refired in air from room temperature to 950° C. in 2.5 hrs. and held at 950° C. for approximately 15 min. The resulting polycrystalline microcapsules were a mixture of transparent, translucent and opaque microcapsules. X-ray diffraction analysis of them showed them to be rutile $TiO_2$ and $SnO_2$, the $TiO_2:SnO_2$ ratio of peak intensities being 100:5. The rutile phase of the $TiO_2$ showed a shift toward a larger lattice dimension from that of normal pure $TiO_2$ rutile material, indicating partial solid solution.

EXAMPLE 5

A sol was prepared by mixing together 5.64 g. aqueous solution of zirconium acetate (22% $ZrO_2$ equivalent), 2 g. aqueous silica sol (Ludox ® LS, 30% $SiO_2$ equivalent), four drops of glacial acetic acid and 5 g. water.

The resulting sol was added to an agitated aqueous alcohol solution of 200 g. n-butyl alcohol and 10 g. of water. After 1 min., the liquid-filled, transparent, spherical microcapsules were recovered by filtering the resultant dispersion through a No. 54 Whatman filter. The recovered microcapsules were dried in air at 95° C. for 0.5 hr., the dried microcapsules being clear, transparent, porous, and spherical. The dried microcapsules were then fired in air from room temperature to 500° C. over a 1 hr. period. The resulting ceramic microcapsules were rigid, crushable, smooth-surfaced, homogeneous, clear, transparent, and spherical with diameter of 100–200 microns and a uniform wall thickness of about 5 microns.

A portion of the ceramic microcapsules were refired in air from room temperature to 950° C. in 2.5 hrs. and held at 950° C. for approximately 15 min., the resultant 950° C. fired microcapsules being rigid, crushable, sealed, air-filled and having the same appearance as the 500° C. fire microcapsules. X-ray diffraction analysis of the 500° C. fired microcapsules gave a pattern which appeared to indicate tetragonal $ZrO_2$ whereas the 950° C. fired capsules provided definite indication of tetragonal $ZrO_2$. In each case, zirconia was the only crystalline species revealed by X-ray diffraction analysis.

EXAMPLE 6

A sol was prepared by mixing together 5 g. of $TiO_2$ gel (prepared as in Example 1), 2.5 g. $ZnCl_2$ (60% ZnO equivalent), and 40 g. water. The sol was added to a 1 liter flask containing a swirling solution of 400 g. n-butanol and 20 g. water. After 1 min. of swirling, the microparticles were recovered by filtering the dispersion through a No. 54 Whatman filter. The resulting recovered liquid-filled, transparent, spherical microcapsules were dried in air at 95° C. for 0.5 hr., the dried microcapsules being clear, transparent, porous and spherical.

The dried microcapsules were placed in an air atmosphere, 240° C. kiln and the temperature raised to 550° C. in about 45 min. The fired microcapsules were slowly cooled in the kiln. The cooled ceramic microcapsules were rigid, crushable, free-flowing, smoothsurfaced, homogeneous, and spherical and most of them were clear, transparent, and colorless.

X-ray diffraction analysis of the ceramic microcapsules showed them to contain anatase titania, $TiO_2$. After further firing to 950° C. in air from room temperature over 2.5 hrs. and holding at 950° C. for 15 min., the X-ray diffraction analysis showed rutile $TiO_2$ and the presence of a very low intensity peak indicated a small amount zinc titanate.

X-ray fluorescent examination of the 950° C. fired microcapsules showed only about 3–5% ZnO to be present.

EXAMPLE 7

A titania sol was made by dispersing 5 g. of a gel (63% $TiO_2$, made as in Example 1) in 50 g. water. The resulting sol was slowly poured into a stirred solution of 1200 g. n-butyl alcohol and 60 g. water, and stirring was continued for about 1 min. The dispersion of liquid-filled, transparent, spherical microcapsules was filtered using No. 54 Whatman paper.

The recovered microcapsules were dried in air at room temperature for 1 hr., then further dried in air at 95° C. for 2 hrs. The dried microcapsules were porous, clear, transparent and spherical with diameters up to 300 microns and walls which were generally less than 10 microns thick. The microcapsules were fired in air from room temperature to 400° C. in about 0.5 hr., held at 400° C. for 1 hr. in an air atmosphere, permitted to cool in the furnace to 200° C., and then withdrawn and cooled to room temperature within a few minutes. The resulting ceramic microcapsules were rigid, crushable, free-flowing, smooth-surfaced, homogeneous, clear, transparent, porous, and spherical.

Samples of the ceramic microcapsules loaded in alumina combustion boats were placed in an electrically heated tube furnace having a 75 mm. diameter tube of Vycor ® which was then sealed with gas-tight caps on each end. The sealed tube was evacuated to a pressure of 5 Torr to remove air from the porous microcapsules. The evacuated tube was heated to about 300° C. over 1.5 hrs. and then argon was slowly introduced to the evacuated tube until a pressure of 1 atmosphere was reached. The temperature was then raised to about 600° C. in about 1 hr. and held at 600° C. for 1 hr. to heat seal the microcapsules and entrap argon therein, the tube being continuously flushed (during the sealing) with argon at a rate of 135 liters/hr. and with a pressure just slightly above 1 atmosphere. The resulting argon-filled, sealed microcapsules were cooled in the furnace under argon to room temperature.

Samples of the argon-filled microcapsules were analyzed qualitatively for gas composition by breaking the microcapsules in a sealed evacuated tube and analyzing the gas in the tube with a mass spectrometer. One of these samples contained predominantly argon with small amounts of $CO_2$ and $N_2$; another sample contained $CO_2$ with some argon and $N_2$. After six months storage, another sample of filled microcapsules was analyzed as above and found to contain predominantly argon.

EXAMPLE 8

A titania sol was made by dispersing 2 g. $TiO_2$ gel (made as in Example 1) in 30 g. water. The resulting sol was poured into a swirling solution of 400 g. n-butanol and 40 g. water. The resulting mixture was swirled for about 0.5 min. and the resulting dispersed spherical microparticles were separated by filtering the mixture through a No. 54 Whatman paper.

The recovered predominantly liquid-filled, transparent, spherical microcapsules were dried in air at room temperature for several hours. The dry, porous, green microparticles were stirred into a Fluorinert ® 77 fluorocarbon (an inert fluorocarbon mixture of compound corresponding to the empirical formulas: $C_8F_{18}$, $C_8F_{16}$, and $C_7F_{15}NO$); the microcapsules floated to the surface of the fluorocarbon and a small amount of solid microparticles and broken or thick-walled microcapsules sank to the bottom of the fluorocarbon. The floating microcapsules, which had diameters up to 300 microns and wall thicknesses of less than 10 microns, were recovered by decantation and filtration. The residual fluorocarbon liquid vaporized at room temperature from the recovered microcapsules.

The microcapsules were then placed in an air atmosphere furnace at 200° C. The temperature was elevated to 460° C. in 0.5 hr., held for 5 min. and the fired microcapsules were slowly withdrawn from the kiln over a 10-min. period. The fired microcapsules were rigid, crushable, free-flowing, smooth-surfaced, homogeneous, clear, transparent, porous, and spherical.

A sample of the fired microcapsules were loaded in a ceramic boat and the loaded boat was placed in a 250° C. furnace disposed in a chamber capable of being evacuated, and the furnace was held at 250° C. under atmospheric pressure for about 0.5 hr. The chamber, including furnace and loaded boat, was then evacuated to a pressure of $5 \times 10^{-6}$ Torr and the temperature raised to about 450° C. in about 5 min. and held at 450° C. for 1¾ hrs. During the latter heating operation, the pressure in the chamber decreased to about $2 \times 10^{-6}$ Torr. The temperature was then raised to 650° C. over a period of about 10 min., held at 650° C. for about 1 hr. and the furnace cooled within a few minutes' time. The loaded boat of heat sealed, evacuated microcapsules was then removed from the furnace and chamber.

Another sample of the 460° C. air-fired microcapsules was loaded in a ceramic boat, the boat placed in a furnace disposed in a chamber, a small air flow maintained through the chamber while the furnace was raised to 450° C., and the furnace then evacuated to about $10^{-6}$ Torr when 450° C. was attained. The furnace was held for 1½ hrs. at 450° C. under the vacuum. The temperature was then raised to 650° C. over a period of about 10 min., held at 650° C. for about 1 hr., and the furnace cooled within a few minutes' time. The loaded boat of heat sealed, evacuated microcapsules was then removed from the furnace and chamber.

After standing at room temperature for two months' time, each of the two 650° C. fired samples was placed in a vacuum glass chamber (connected to a mass spectrometer) and the chamber evacuated to a pressure of about $10^{-6}$ Torr. The microcapsules in the evacuated chamber were then mechanically broken by dropping a steel ball (which had been held above the microcapsules with an external magnet) and allowing the ball to fall onto the microcapsules to break them. The breaking of the microcapsules resulted in partial pressure changes in the evacuated chamber, this change being immediately registered and measured by the mass spectrometer. The partial pressure changes indicated that the 650° C. fired microcapsules had been sealed with a substantial vacuum inside.

EXAMPLE 9

A sol was made by dispersing with agitation 3 g. $TiO_2$ gel (made as in Example 1) in 30 g. water. The resulting sol was filtered through a 1.5 micron Millipore ® filter and the filtered sol poured into a swirling solution of 600 g. n-butanol and 45 g. water to form gelled microparticles. The swirling was continued for about 1 min. and the resulting microparticles were recovered by filtration through a 45 micron screen. The recovered microparticles were predominantly liquid-filled, transparent, spherical microcapsules and they were dried in air at room temperature for about 20 hrs. The dried microparticles were almost all porous, transparent, spherical microcapsules with diameters generally about 60 to 300 microns and wall thicknesses below 10 microns.

The dried microcapsules were fired in air from room temperature to 460° C. over a period of 1½ hr. and held at 460° C. for 20 min. The fired microcapsules were gradually removed from the furnace. The fired microcapsules were separated from a small amount of solid particles and broken microcapsules by the floatation technique of Example 8. The recovered rigid, crushable, smooth-surfaced, homogeneous, porous, transparent, clear, spherical microcapsules were placed in a vitreous silica tube located in an electric furnace, the ends of the tube sealed, the tube evacuated to $6 \times 10^{-6}$ Torr, and the tube heated to 450° C. in about 14 min. and held at 450° C. for 3 hrs. in the vacuum. The pressure after 3 hrs. was $5 \times 10^{-6}$ Torr. The valve to the vacuum system was closed off and neon gas was permitted to enter the vitreous tube at a slow rate, the pressure being gradually raised to about 1 atmosphere of neon over 5 min. time and the temperature maintained at 450° C. for about 1 hr. The tube was heated to 650° C. in about 10 min. and held at temperature under a neon atmosphere for about 15 hr. The system was allowed to cool for 20 min. under the neon atmosphere and the sealed, neon-filled, microcapsules were removed from the tube. Confirmation that the recovered microcapsules contained gas that was predominantly neon (about ⅝ atmosphere) was obtained by the mass spectrometer technique of Example 7.

EXAMPLE 10

Forty g. of aquasol containing 10.5% $Al_2O_3$ (Nalcoag ® LN-1331-256) were poured into a 1 liter flask containing 400 g. of swirling n-butanol. The sol-alcohol mixture was swirled for 1 min., then rapidly filtered through a Whatman No. 54 paper. The microcapsules obtained were predominantly porous, transparent, liquid-filled, and spherical, with diameters up to 300 microns and substantially uniform wall thickness of about 5 to 25 microns.

The recovered microcapsules were air-dried for about 24 hr. at room temperature to porous, transparent, clear, spherical microcapsules which were then fired from room temperature to 600° C. in about 1½ hr. to form rigid, crushable, smooth-surfaced, free-flowing, homogeneous, porous, transparent, spherical microcapsules of polycrystalline $Al_2O_3$.

EXAMPLE 11

A titania sol was made by dispersing 2 g. $TiO_2$ gel (made as in Example 1) in 20 g. water. The dispersion was poured into 200 g. swirling sec-butyl alcohol to formed gelled microparticles, and swirling continued for 1 min. The dispersion was filtered through No. 54 Whatman filter paper. The recovered particles were predominantly clear, transparent, yellow in color, spherical, liquid-filled microcapsules and generally ranged in diameter from about 10 to 200 microns with a uniform wall thickness of about 3 microns or less. The recovered microcapsules were slowly dried in ambient air at room temperature, resulting in clear, transparent, porous, spherical microcapsules in a green state. When fired in air, e.g. 400° C. for about 1 hr., they will be rigid, crushable, clear, transparent, homogeneous, smooth-surfaced, free-flowing, porous, spherical microcapsules of polycrystalline anatase $TiO_2$ and can be further fired, e.g. 650° C. for about 1 hr., to form sealed microcapsules filled with selected materials.

EXAMPLE 12

Twenty g. of alumina sol (Nalcoag ® LN 1331-256 having 10.5% $Al_2O_3$) were poured into 200 g. of swirling sec-butyl alcohol to form gelled microparticles. After swirling 1 min., the dispersion was filtered through a No. 54 Whatman filter paper. The recovered microparticles were predominantly clear, transparent, colorless, porous, liquid-filled, spherical microcapsules having diameters up to 300 microns and wall thicknesses generally less than 10 microns. After slowly drying in ambient air, the dried microcapsules were porous, clear, colorless, transparent, and spherical. The dried microcapsules could be fired in air (e.g. 600° C. for about 1 hr.) to form rigid, crushable, porous, smooth-surfaced, free-flowing, homogeneous, clear, transparent, spherical microcapsules of polycrystalline

17

Al$_2$O$_3$ which could be sealed with a selected material filled therewithin.

EXAMPLE 13

Forty g. of sol (Nalco ® LN-1331-273 containing the equivalent of 5.36% Fe$_2$O$_3$ were poured into 400 g. of gently swirling n-butanol in a 1-liter flask to form gelled microparticles. Swirling was continued for 0.5 min. and the dispersion filtered through No. 54 Whatman filter paper. The recovered microparticles were predominantly liquid-filled, transparent, porous, spherical microcapsules; they were slowly dried for several days at room temperature to permit the liquid within the porous microcapsules to evaporate. The resulting clear, shiny, dry, transparent, porous, spherical microcapsules were predominantly between 100 and 200 microns in diameter, had uniform wall thicknesses averaging between 5 and 10 microns, and were amber in color.

A portion of the dried microcapsules were placed in an alumina boat, fired in air from room temperature to 600° C. over one-hour's time, and cooled to room temperature. The fired microcapsules were rigid, crushable, smooth-surfaced, free-flowing, transparent, spherical, and of polycrystalline iron oxide. The color of the fired microcapsules ranged from red to black as observed by the unaided eye. Under the microscope at 140X, the red microcapsules appeared to be grainy but smooth, and said black microcapsules were red, shiny, and very clear; many of the latter clear microcapsules were attracted to a magnet.

EXAMPLE 14

Twenty g. of a sol (Nalco ® LN-1331-270) containing the equivalent of 6.16% Cr$_2$O$_3$ were poured into a solution of 300 g. n-butanol and 15 g. water being gently stirred by a laboratory stirrer. Stirring continued for 1 min. and the dispersion was filtered to recover the resulting porous, liquid-filled, transparent, spherical, gelled microcapsules.

After drying in the air at room temperature the resulting porous microcapsules (green in color) were examined under a microscope at 140X and observed to be spherical with transparent walls. The dried product was fired in the air from room temperature to 500° C. in 45 min. and held at 500° C. for 2 hr. The fired microcapsules were rigid, crushable, smooth-surfaced, free-flowing, homogeneous, spherical, opaque, green in color, grainy, and very shiny and of polycrystalline Cr$_2$O$_3$.

EXAMPLE 15

Twenty g. of Al$_2$O$_3$ sol having 10.5% Al$_2$O$_3$ and two drops of Cr$_2$O$_3$ sol having 6.16% Cr$_2$O$_3$ were blended together and microcapsules made as in Example 14. The microcapsules were recovered, dried and fired from room temperature to 1250° C. in 2 hr. and held at 1250° C. for 24 hr. The fired microcapsules were rigid, crushable, smooth-surfaced, free-flowing, homogeneous, spherical polycrystalline and were opaque and pink indicating a coloration of the alumina by the Cr$_2$O$_3$ as in ruby.

EXAMPLE 16

A titania sol was obtained by dispersing 2½ g. TiO$_2$ gel (made as in Example 1 containing the equivalent of 61.7% by weight TiO$_2$) in 20 g. water. Secondary butanol (200 g.) was agitated in a Waring Blender rapidly, but controlled to cause rapid swirling without frothing. The titania sol was poured into the alcohol and agitation continued for about 3 sec. The resulting dispersion of microparticles was filtered through a No. 54 Whatman filter paper. After drying in the air at room temperature to remove the solvent from the recovered particles, the resulting dry gel agglomerates of microcapsules were shaken in Fluorinert ® FC-77 fluorocarbon to aid in separation of the individual tiny microcapsules, filtered, and dried at room temperature for 2 hr. then at 90° C. for 1½ hr. The recovered spherical microcapsules were predominantly clear, transparent, porous and very small and were screened through 30 and 20 micron sleeves and fired in air from room temperature to 400° C. over ¾ hr. Microcapsules of 5 microns diameter and smaller were observed microscopically. The percent by weight of fired microcapsules in the various size ranges was:

| Fraction, microns | % by Weight |
| --- | --- |
| +30 (max. 50) | 15 |
| −30 +20 | 18.4 |
| −20 | 66.6 |
| | 100.0 |

EXAMPLE 17

A solution was made by dissolving 28.1 g. basic aluminum acetate, Al(OH)$_2$(OOCH$_3$).⅓H$_3$BO$_3$ (Niaproof ®), in 171 g water. Twenty g. of silica sol (Ludox ® LS, 30% SiO$_2$) which had been preacidified with three drops of concentrated hydrochloric acid (37%) was stirred in the solution. Twenty ml. of the resulting sol was poured into a swirling body of 200 g. sec-butanol in a 500 ml. flask. Swirling was continued for 1 min. and the microparticles were recovered by filtering through a No. 54 Whatman filter paper. The filtered microparticles were slowly dried in air at room temperature. The dried microparticles were examined under a stereoscopic microscope and all were found to be spherical with at least 90% of the particles in the form of porous microcapsules with diameters ranging from about 10 to 500 microns, the average diameter being about 100 microns. Wall thicknesses of these microcapsules were uniform within each microcapsule and varied between particles from about 4 to 20 microns, with the average thickness being about 10 microns. Practically all of the microcapsules were transparent and clear (a minor amount were hazy but still transparent, and a minor amount were opaque and had relatively thick walls). A portion of the dried microcapsules were fired from room temperature to 500° C. over a 2 hr. period and then cooled in room temperature air. The fired microcapsules were rigid, crushable, transparent, smooth-surfaced, free-flowing, homogeneous, and spherical. The appearance as observed under a stereoscopic microscope at 140X was essentially the same as that of un-fired microcapsules. A small quantity of the fired microcapsules were stirred in a drop of index oil (1.58) on a glass slide and the microcapsule walls were determined to be porous by observing the penetration of index oil through the walls.

EXAMPLE 18

A measure of the time to form microcapsules was made in a series of runs wherein standard conditions were maintained with the exception of the length of time that a sol was swirled in dehydrating liquid. The results show that microcapsules can be formed within a few seconds and a substantial yield produced within about 15 seconds.

The results are tabulated in the table below. The sol used in the runs was prepared as in Example 1 from 1 part of $TiO_2$ gel (61% $TiO_2$) and 10 parts of water. In each run, the sol (20.0 g.) was added all at once into 200 g. of n-butanol being swirled by hand. The swirling was continued for a certain time immediately after addition and then the contents were poured all at once onto a No. 54 Whatman filter paper on a Buchner funnel (10.2 cm. diameter) fitted on a water aspirated flask. The time required to filter the contents was noted. The filter paper loaded with the filtered, liquid-filled microcapsule product was air dried at room temperature for 2 hrs., and then dried at 90° C. for ½ hr. The product was removed from the filter paper by tapping and weighed to give a dry weight of microcapsules. The dried microcapsules were fired from room temperature to 500° C. over a period of ½ hr. The resulting fired microcapsules were weighed. The final fired rigid, crushable smooth-surfaced product was clear, transparent, homogeneous, spherical microcapsules with diameters up to 300 microns.

| Swirl time, sec.* | Filtration time, sec.** | Dry weight of microcapsules, g. | Fired weight of microcapsules, g. |
|---|---|---|---|
| 5 | 200 (filter paper was coated with sticky gel) | 0.40 (microcapsules adhered to filter paper) | 0.29 |
| 10 | 25 | 1.20 (slight amount of microcapsules could not be tapped from filter paper) | 0.87 |
| 15 | 20 | 1.40 | 1.02 |
| 30 | 18–20 | 1.44 | 1.00 |
| 60 | 18–20 | 1.41 | 1.02 |

*Time from moment of sol addition to moment of pouring dispersion on filter.
**Time from pouring dispersion on filter to moment filter cake appeared dull, indicating dehydrating liquid has passed through filter.

The above data show that at 5 seconds swirl time, some of the sol had gelled to form microcapsules, but much of it was not sufficiently dehydratively gelled, hence the filtration was slow and the yield was low. By 10 seconds swirl time, the formation of microcapsules was almost complete, and the difference in results between the 15, 30, and 60 seconds runs was virtually indistinguishable. These data show that substantially quantitative yields of gelled microcapsules can be obtained in accordance with this invention within 30 seconds.

EXAMPLE 19

Dried titania microcapsules were prepared as described in Example 9 and fired from room temperature to 460° C. over a period of 1⅓ hrs. and held at 460° C. for 20 min. The resulting rigid, crushable, smooth-surfaced, free-flowing, homogeneous, porous, transparent, spherical microcapsules of polycrystalline anatase $TiO_2$ were utilized in preparing a number of composites as described below.

A quantity of the fired microcapsules prepared as described above were placed in a 2.5 cm. diameter steel mold together with small pieces of Woods metal. The mold was heated to 115° C. and a plunger was inserted into the mold. Gentle, firm pressure was applied to the plunger to pack the mold. The mold was cooled to 40° C. and the microcapsule-Woods metal composite (0.31 cm. thick) was extracted therefrom. After cooling the composite to room temperature, it was broken and examined microscopically at 60X and 140X. A well-packed dispersion of intact, microcapsules in the metal matrix was observed, the microcapsules being the major component by volume.

Fired microcapsules prepared as described above were further heated from about 450° C. to 600° C. over a period of about 2 hrs. The microcapsules were cooled and when examined with a stereoscopic microscope (140X) were observed to be transparent, spherical, and impermeable to index oil. A portion of these microcapsules was mixed into a viscous solution of polymethylmethacrylate dissolved in acetone. The resulting mixture was cast into a sheet about 0.31 cm. thick and the solvent was allowed to evaporate from the mixture. A solid sheet was obtained and under microscopic examination the microcapsules were observed intact and dispersed within the composite.

A portion (1 g.) of the above-described microcapsules (fired to 600° C.) was mixed with 5 g. of powdered bottle glass. The mixture was placed in an alumina crucible and placed in a furnace preheated to 1080° C. and held at that temperature for a time sufficient to melt the glass, at which point the microcapsules floated to the top of the melt. The crucible was withdrawn from the furnace and cooled in air to room temperature. The glass-microcapsule composite was removed from the crucible by fracturing the crucible. Microscopic examination (140X) of fractured pieces of the composite showed that the microcapsules concentrated at the top region of the composite where they were firmly embedded as intact, discrete, dispersed microcapsules in the clear glass matrix.

EXAMPLE 20

An alumina crucible (1.9 cm. diameter, 2.5 cm. height) was loaded about ¾ full with the fired microcapsules (fired to 600° C.) prepared as described in Example 19. The loaded crucible was placed in a furnace with an air atmosphere and the temperature raised from room temperature to 1200° C. over a 2 hr. period. Then the temperature was raised to 1475° C. over a 5 hr. period. The crucible and contents were permitted to cool overnight in the furnace and an integral mass was extracted from the crucible. Microscopic examination (140X) showed considerable crystal growth of the titania in the microcapsules walls, but the microcapsules were still hollow and spherical. The microcapsules had sintered together at points of contact.

Various modifications and alterations of this invention become apparent to those skilled in the art without departing in the spirit and scope of this invention, and it should be understood that this invention is not to be limited in the illustrative embodiment set forth herein.

What is claimed is:

1. A process for making spherical microcapsules comprising the steps of adding percursor material comprising an aqueous solution, dispersion or sol of one or more metal oxides (or compounds calcinable to metal oxide) to a liquid body of a dehydrating agent comprising an organic dehydrating liquid, agitating said liquid body to maintain the resulting droplets of said precursor material in suspension and prevent settling thereof, to maintain relatively anhydrous dehydrating liquid in contact with the surface of said droplets as they are dehydrated, and to rapidly extract within 30 seconds at ambient temperatures of 20° to 40° C. the major amount of water from said droplets and form gelled microparticles therefrom, the predominant amount of said gelled microparticles being in the form of spherical, gelled, porous, liquid-filled microcapsules, recovering said liquid-filled microcapsules, drying the resulting recovered microcapsules at temperatures and pressures adjusted to minimize fracture and bursting the same and remove liquid from within the recovered microcapsules, and firing the resulting dried microcapsules to form spherical ceramic microcapsules the peripheral wall or shell of each which encloses the single hollow within the interior thereof being porous and heat-sealable, homogeneous, and made of non-vitreous ceramic comprising polycrystalline metal oxide or amorphous metal oxide convertible to polycrystalline metal oxide upon firing at higher temperature.

2. The process of claim 1 wherein said firing is carried out in the presence of a select gas and at a sufficient temperature to seal each said microcapsule with said select gas sealed within the hollow thereof.

3. The process of claim 1 wherein said fired, porous microcapsules are immersed in a select liquid to fill each said microcapsule with said select liquid which is sealed within the hollow thereof.

4. The process of claim 1 wherein each of said fired, porous microcapsules has a select solid filled within the hollow thereof.

5. The process of claim 1 wherein said organic dehydrating liquid is n-butanol or sec-butanol, wherein said aqueous precursor material is an aqueous titania sol, and wherein said ceramic consists of polycrystalline titania.

6. A process for making spherical microcapsules comprising the steps of adding precursor material comprising an aqueous sol of a ceramic metal oxide to a swirling liquid body of a dehydrating agent comprising an organic dehydrating liquid having a limited solubility of about 3 to 50 weight percent for water at about 23° C., swirling said liquid body to maintain the resiulting droplets of said precursor material in suspension, to maintain relatively anhydrous dehydrating liquid in contact with the surface of said droplets as they are dehydrated, and to extract within 30 seconds at ambient temperatures of 20° to 40° C. the major amount of water from the said droplets and form gelled microparticles therefrom, the predominant amount of said gelled microparticles being in the form of spherical, gelled transparent, porous, liquid-filled microcapsules, recovering said liquid-filled microcapsules, drying the resulting recovered microcapsules at temperatures and pressures adjusted to minimize fracture and bursting the same and remove liquid from within the recovered microcapsules, and firing the resulting dried microcapsules to form rigid, crushable, smooth-surfaced, free-flowing, spherical microcapsules the peripheral wall or shell of each which encloses the single hollow within the interior thereof being porous, homogeneous, transparent, of uniform thickness and made of homogeneous, non-vitreous ceramic comprising polycrystalline ceramic metal oxide or amorphous ceramic metal oxide convertible thereto upon firing in air at higher temperature.

7. Spherical, free-flowing, discrete microcapsules, the peripheral wall or shell of each which encloses the single hollow within the interior thereof being uniformly thick, homogeneous, impermeable, filled with a liquid and made of non-vitreous ceramic consisting essentially of polycrystalline metal oxide or amorphous metal oxide convertible to polycrystalline metal oxide upon firing.

8. Spherical, free-flowing, discrete microcapsules, the peripheral wall or shell of each which encloses the single hollow within the interior thereof being uniformly thick, homogeneous, impermeable, filled with a solid and made of non-vitreous ceramic consisting essentially of polycrystalline metal oxide or amorphous metal oxide convertible to polycrystalline metal oxide upon firing.

9. Spherical microcapsules, the peripheral wall or shell of each which encloses the single hollow within the interior thereof consisting of polycrystalline titanium oxide.

10. Microcapsules according to claim 9, the wall of each being transparent.

11. Microcapsules according to claim 9, the wall of each being porous.

12. Microcapsules according to claim 9, the wall of each being impermeable and the hollow thereof being filled with gas.

13. Microcapsules according to claim 9, the wall of each being impermeable and the hollow thereof being evacuated.

14. Spherical, free-flowing, discrete, rigid, crushable, smooth-surfaced microcapsules, the peripheral wall or shell of each which encloses the single hollow within the interior thereof being uniformly thick, homogeneous, transparent, and made of non-vitreous ceramic consisting essentially of polycrystalline metal oxide comprising titanium dioxide.

15. The microcapsules of claim 14 wherein said polycrystalline metal oxide further comprises $Fe_2O_3$.

16. The microcapsules of claim 14 wherein said polycrystalline metal oxide further comprises $SnO_2$.

17. The microcapsules of claim 14 wherein said polycrystalline metal oxide further comprises ZnO.

18. Spherical, free-flowing, discrete, dry, unfired, non-expanded microcapsules, the peripheral wall or shell of each which encloses the single hollow within the interior thereof being transparent, porous, and made of gel of one or more metal oxides (or compounds calcinable to metal oxide) which upon firing said unfired microcapsules are converted to non-vitreous ceramic consisting essentially of metal oxide in polycrystalline form or in amorphous form convertible to said polycrystalline form upon further firing.

19. Unfired microcapsules according to claim 18, wherein said metal oxides are ceramic metal oxides.

20. Unfired microcapsules according to claim 18, each having a diameter of 1 to 1,000 microns and a uniform wall thickness of 0.1 to 100 microns.

21. Unfired microcapsules according to claim 18, wherein said metal oxides are selected from the group consisting of $TiO_2$, $WO_3$, $ThO_2$, $Fe_2O_3$, $Y_2O_3$, $HfO_2$, $Nb_2O_5$, $UO_2$, BeO, $In_2O_3$, $Sb_2O_3$, $SnO_2$, and mixtures thereof.

22. A composite comprising a metal, plastic, elastomer, or ceramic and unfired microcapsules according to claim 18.

23. Spherical, free-flowing, discrete, dry, unfired microcapsules, the peripheral wall or shell of each which encloses the single hollow with the interior thereof being transparent, porous, and made of gel of one or more metal oxides (or compounds calcinable to metal oxide) which upon firing said unfired microcapsules are converted to non-vitreous ceramic consisting essentially of metal oxide in polycrystalline form or in amorphous form convertible to said polycrystalline form upon further firing, said metal oxide comprising iron oxide.

24. Spherical, free-flowing, discrete, dry unfired microcapsules, the peripheral wall or shell of each which encloses the single hollow with the interior thereof being transparent, porous, and made of gel of one or more metal oxides (or compounds calcinable to metal oxide) which upon firing said unfired microcapsules are converted to non-vitreous ceramic consisting essentially of metal oxide in polycrystalline form or in amorphous form convertible to said polycrystalline form upon further firing, said metal oxide comprising titanium oxide.

25. Unfired microcapsules according to claim 24, wherein metal oxide further comprises $Fe_2O_3$.

26. Unfired microcapsules according to claim 24, wherein metal oxide further comprises $SnO_2$.

27. Unfired microcapsules according to claim 24, wherein metal oxide further comprises $ZnO$.

28. Unfired microcapsules according to claim 18.

29. Spherical, free-flowing, discrete, dry unfired microcapsules, the peripheral wall or shell of each which encloses the single hollow with the interior thereof being transparent, porous, and made of gel of one or more metal oxides (or compounds calcinable to metal oxide) which upon firing said unfired microcapsules are converted to non-vitreous ceramic consisting essentially of metal oxide in polycrystalline form or in amorphous form convertible to said polycrystalline form upon further firing, said metal oxide comprising $Cr_2O_3$.

* * * * *

UNITED STATES PATENT AND TRADEMARK OFFICE
CERTIFICATE OF CORRECTION

PATENT NO. : 4,349,456
DATED : September 14, 1982
INVENTOR(S) : Harold G. Sowman It is certified that error appears in the above—identified patent and that said Letters Patent is hereby corrected as shown below:

Col. 9, l. 40: "plastic metal" should read -- plastic, metal --.
Col. 18, l. 11: "sleeves" should read -- sieves --.
Col. 21, l. 9: "fracture" should read -- fracturing --.
Col. 21, l. 40: "resiulting" should read -- resulting --.
Col. 21, l. 52: "fracture" should read -- fracturing --.
Col. 22, l. 63: "with" should read -- within --.
Col. 23, l. 6: "with" should read -- within --.
Col. 24, l. 5: "Unfired microcapsules according to claim 18." should read -- Unfired microcapsules according to claim 18, wherein said metal oxide comprises $Al_2O_3$. --.
Col. 24, l. 8: "with" should read -- within --.

Signed and Sealed this

Eighth Day of February 1983

[SEAL]

Attest:

Attesting Officer

GERALD J. MOSSINGHOFF
Commissioner of Patents and Trademarks